United States Patent

Sonehara

[11] Patent Number: 5,098,183
[45] Date of Patent: Mar. 24, 1992

[54] DICHROIC OPTICAL ELEMENTS FOR USE IN A PROJECTION TYPE DISPLAY APPARATUS

[75] Inventor: Tomio Sonehara, Suwa, Japan
[73] Assignee: Seiko Epson Corporation, Tokyo, Japan
[21] Appl. No.: 403,515
[22] Filed: Sep. 6, 1989

[30] Foreign Application Priority Data

Sep. 12, 1988 [JP] Japan .................................. 63-227814

[51] Int. Cl.$^5$ .................. G02B 27/10; G03B 21/00
[52] U.S. Cl. .............................. 353/31; 353/33; 353/121; 353/34; 359/490; 359/634; 359/831
[58] Field of Search ................. 353/30, 31, 33, 34, 353/121, 20; 350/397, 398, 172, 331 R, 337, 397, 398, 286; 352/40, 42

[56] References Cited

U.S. PATENT DOCUMENTS

| | | | |
|---|---|---|---|
| 3,650,608 | 3/1972 | Baker | 353/121 |
| 3,767,290 | 10/1973 | Lang | 350/403 |
| 3,961,334 | 6/1976 | Whitby et al. | 350/397 |
| 4,127,322 | 11/1978 | Jacobson et al. | 353/31 |
| 4,191,456 | 3/1980 | Hong et al. | 353/31 |
| 4,461,542 | 7/1984 | Gagnon | 350/331 R |
| 4,464,018 | 8/1984 | Gagnon et al. | 350/331 R |
| 4,500,172 | 2/1985 | Gaganon et al. | 350/331 R |
| 4,850,685 | 7/1989 | Kamakura et al. | 350/397 |
| 4,909,601 | 3/1990 | Yajima et al. | 353/31 |
| 4,911,547 | 3/1990 | Ledebuhr | 353/31 |
| 4,943,154 | 7/1990 | Miyatake et al. | 353/31 |
| 4,969,730 | 11/1990 | van den Brandt | 353/31 |

OTHER PUBLICATIONS

"LCD Full-Color Video Projector", by Shinji Morozumi et al., SID 86 Digest, pp. 375–378.
"9.2: A New Color—TV Projector", by Alexander D. Jacobson et al., SID 77 Digest, pp. 106–107.

*Primary Examiner*—William A. Cuchlinski, Jr.
*Assistant Examiner*—William C. Dowling
*Attorney, Agent, or Firm*—Kaplan Blum

[57] ABSTRACT

A dichroic optical element disposed on at least one surface of each of four right angled prisms for transmitting and reflecting different wavelengths of polarized light. Each of the dichroic layers is characterized by wavelength selection properties which vary in response to the polarization of the light received by the dichroic layers. A projection type display device includes a first optical device characterized by at least one first wavelength transition region and a second optical device characterized by at least one second wavelength transition period. The first wavelength transition region does not effectively overlap the second wavelength transition region. Efficient utilization of the light source for projecting an image results.

44 Claims, 8 Drawing Sheets

DICHROIC OPTICAL ELEMENTS FOR USE IN A PROJECTION TYPE DISPLAY APPARATUS

BACKGROUND OF THE INVENTION

The invention relates generally to a dichroic optical element, and more particularly to dichroic optical elements for use in a projection type display apparatus in which a projected image is formed using light valves.

A conventional dichroic optical element such as a polarized beam splitter, dichroic mirror or other device such as disclosed in U.S. Pat. Nos. 4,464,018; 4,191,456; and 4,461,542 is characterized by its polarized and wavelength separation properties. These properties are chosen independent of one another.

A typical, well known projection type display apparatus is disclosed in S.I.D. '86 Digest No. Page 375 (1986). The apparatus separates white light into colored light which is modulated by light valves in accordance with the image to be produced. The modulated colored lights are then synthesized (i.e., combined with one another) to form a color image which is projected toward a screen for display.

Conventional dichroic optical elements passively divide (i.e., separate) light but are not used to actively change the separating properties. White light can be separated into its primary colors (e.g., red, green and blue) by a first dichroic optical element. The primary colors are then synthesized by a second dichroic optical element having the same wavelength separation properties as the first dichroic optical element. In other words, the primary colors of light pass through two optical elements which have the same wavelength separation properties. The light intensity of the synthesized image is far less than the intensity of the white light prior to separation by the first optical element.

This reduction in light intensity can be understood by initial reference to FIG. 10(a) which illustrates the wavelength selection properties of a conventional dichroic optical element. The blue (B), green (G) and red (R) wavelengths of light each have skirts 1001, 1002 and 1003 hereinafter referred to as wavelength transition regions, respectively. FIG. 10(b) illustrates the light intensity spectrum of the red (R), green (G) and blue (B) color lights following synthesis, that is, after the colored lights are recombined. The light intensity of the primary colors of light in FIG. 10(b) is reduced by about 50% compared to the light intensity of the primary colors of FIG. 10(a). In particular, a significant loss of light from use of two optical elements having the same wavelength characteristics for separation and synthesis results in an inefficient use of light flux. To ensure that the synthesized colored light is of a suitable intensity, a high powered light source providing the incident white light to the first optical element is required.

Accordingly, it is desirable to provide a dichroic optical element which has different wavelength selection properties. It is also desirable to provide a projection type display device using two dichroic optical elements which more efficiently utilizes and thereby reduces the power requirements of the light source.

SUMMARY OF THE INVENTION

Generally speaking, in accordance with the invention, an optical element includes a body having more than one surface and at least one dichroic layer on at least one of the surfaces of the body for transmitting and reflecting different wavelengths of polarized light. Each dichroic layer is characterized by wavelength selection properties which vary in response to the polarization of the light received by the dichroic layer.

The dichroic layer reflects light of a first wavelength having a first transition region in response to being illuminated by a first polarized light and reflects light of a second wavelength having a second transition region in response to being illuminated by a second polarized light. The first and second transition regions have substantially no common wavelength therebetween (i.e., effectively do not overlap one another). The first and second wavelengths are within a range of between about 400 nm to 700 nm (i.e., the visible range of light).

Each dichroic layer reflects either the red and yellow wavelengths of light or the blue and cyan wavelengths of light. When two dichroic layers are used, the dichroic layers are positioned so as to cross each other.

The body preferably includes four right angle prisms wherein at least one surface of at least two prisms has dichroic layers disposed thereon. Each prism has two right angled sides. Those prisms which include a dichroic layer have the dichroic layer on one of the two right angled sides.

In another aspect of the invention, a projection type display apparatus includes a source of light including light of at least two colors; a first optical device for separating the incident light into said colors of light and characterized by at least one first wavelength transition region; and more than one light valve for receiving and modulating the colors of light. The apparatus further includes a second optical device for synthesizing the modulated colors of light and producing a synthesized image. The second optical device is characterized by at least one second wavelength transition region. A lens is used for projecting the synthesized image onto a screen.

At least one first wavelength transition region of the first optical device does not effectively overlap at least one second wavelength transition of the second optical device. Consequently, the light source is efficiently utilized.

The first optical device and second optical device each have at least one dichroic layer. In one preferred embodiment, the first optical device and second optical device each have two dichroic layers. The two dichroic layers of the first optical device have different wavelength selection properties. Similarly, the two dichroic layers of the second optical device have different wavelength selection properties. The two dichroic layers of the first optical device are positioned at substantially right angles to each other. The two dichroic layers of the second optical device are also positioned substantially at right angles to each other.

Each dichroic layer of the first optical device and of the second optical device has a wavelength transition region. The dichroic layers of the first optical device each produce one of the different colors of light. Each of the dichroic layers of the second optical device is positioned relative to a corresponding dichroic layer of the first optical device to receive the colored light produced by the corresponding dichroic layer of the first optical device as modulated by one of the light valves. The wavelength transition regions of corresponding dichroic layers of the first optical device and second optical device do not effectively overlap one another.

In one feature of the invention, one of the two dichroic layers of the first optical device and one of the two dichroic layers of the second optical device ar operable for reflecting the red wavelength of light. The other of the two dichroic layers of the first optical device and the other of the two dichroic layers of the second optical device are operable for reflecting the blue wavelength of light. Alternatively, one of the two dichroic layers of the first optical device and one of the two dichroic layers of the second optical device are operable for reflecting the yellow wavelength of light. The other of the two dichroic layers of the first optical device and the other of the two dichroic layers of the second optical device are operable for reflecting the cyan wavelength of light.

The dichroic layers of the second optical device transmit and reflect different wavelengths of polarized light. These dichroic layers are characterized by wavelength selection properties which vary in the response to the polarization of the light received by these dichroic layers.

The light valves are operable for polarizing the modulated colors of light at different angles of polarization. The dichroic layers of the first optical device separate the incident light into different colors by reflecting and transmitting different wavelengths of the incident light. The wavelengths of light transmitted and reflected by the first optical device are polarized by the light valves at different polarizing angles.

Accordingly, it is an object of the invention to provide an improved dichroic optical element having wavelength selection properties which vary in response to polarization of light which illuminates the element.

It is another object of the invention to provide an improved projection type display device which efficiently utilizes and reduces the power requirements of its light source.

It is a further object of the invention to provide an improved projection type display device which includes two dichroic optical elements having different wavelength selection properties.

Still other objects and advantages of the invention will, in part, be obvious and will, in part, be apparent from the specification.

The invention accordingly, comprising several steps and the relation of one or more such steps with respect to each of the others and the apparatus embodying features of construction, a combination of elements and arrangement of parts which are adapted to reflect such steps, all is exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

The following four examples describe different embodiments of the invention.

EXAMPLE 1

Figure 1:
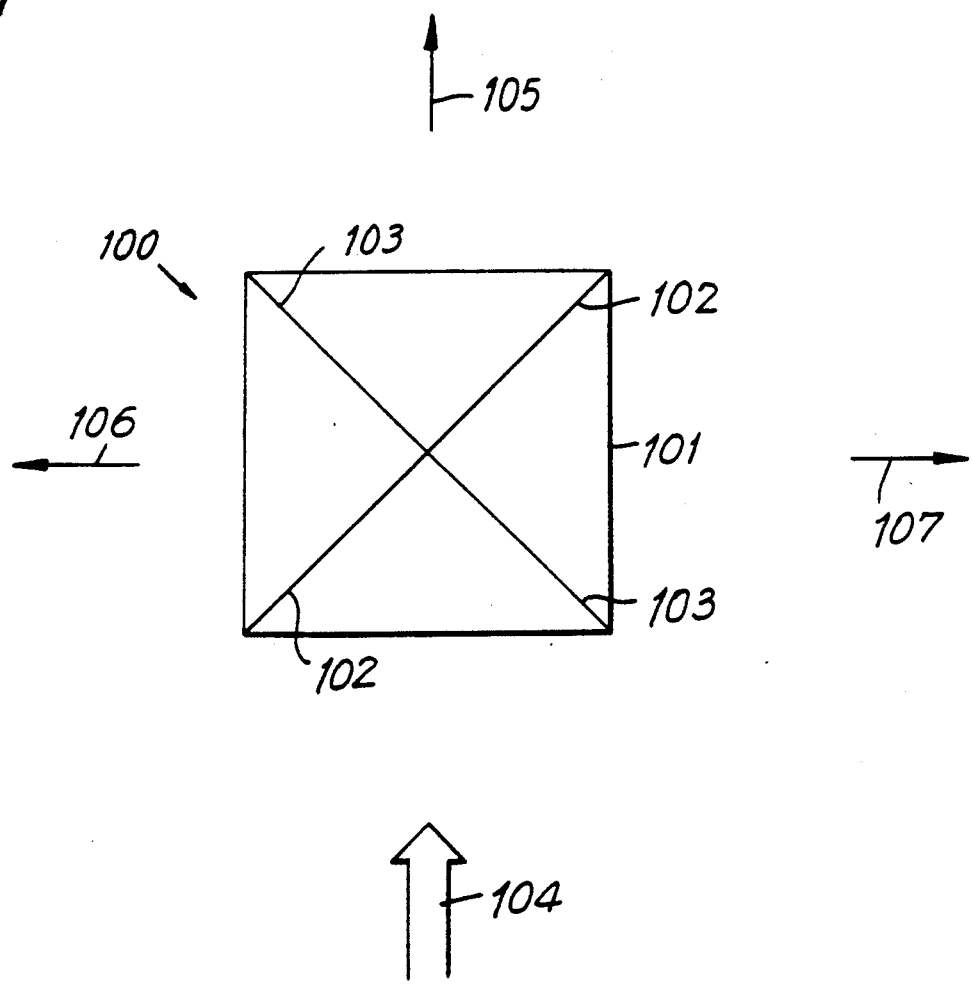
FIG. 1 is a top plan view of a dichroic element in accordance with the invention.

As shown in FIG. 1, a dichroic optical element 100 includes four right angled prisms 101 which are connected together using adhesive or the like. A pair of dichroic layers 102 and 103 coat the right angled sides of prisms 101. Dichroic layer 102 reflects the red wavelength of P polarized light and the yellow wavelength of S polarized light. The S and P polarized lights are at different angles of polarization. Dichroic layer 103 reflects the blue wavelength of P polarized light and the cyan (C) wavelength of S polarized light.

Figure 3A:
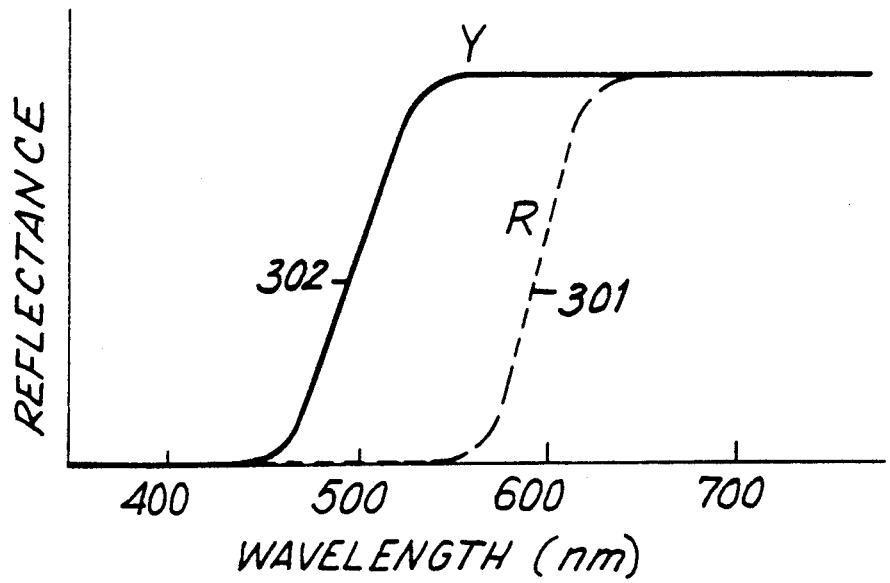
FIG. 3(a) is a plot of reflectance versus wavelength of the dichroic optical element for the red and yellow wavelengths of light.
Figure 3B:
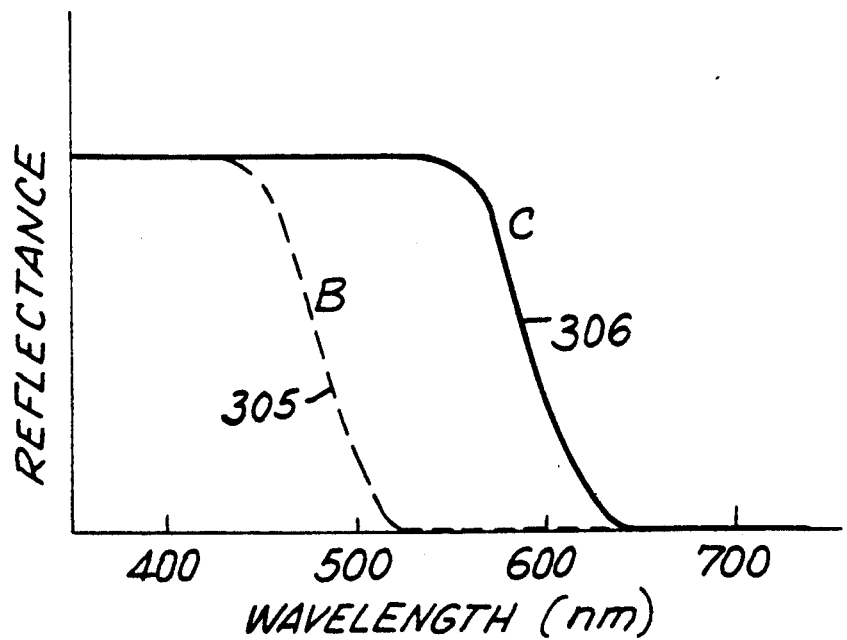
FIG. 3(b) is a plot of reflectance versus wavelength of the dichroic optical element for the blue and cyan wavelengths of light.

FIGS. 3(a) and 3(b) illustrate the reflective properties of dichroic layers 102 and 103, respectively. The dashed lines represent the wavelength properties for the P polarized light. The solid lines represent the wavelength properties for the S polarized light. The red (R) and blue (B) wavelengths of light reflected by dichroic layers 102 and 103 include a pair of wavelength transition regions (i.e., skirts) 301 and 305 in response to the P polarization of light, respectively. The yellow (Y) and cyan (C) components of light reflected by dichroic layers 102 and 103 include a pair of wavelength transition regions 302 and 306 lights in response to the S polarized light, respectively. Wavelength transition regions 301, 302, 305 and 306 are between 400 and 700 nm, that is, within the visible region of light. Transition regions 301 and 302 do not effectively overlap one another. Similarly, transition regions 305 and 306 do not effectively overlap one another.

Referring once again to FIG. 1, dichroic optical element 100 separates incident light 104 into a transmitted light 105, a reflected light 106 and a reflected light 107. By polarizing incident light 104, the wavelength separation properties of dichroic optical element 100 can be controlled. For example, linearly P polarized white light, which is parallel to the surface of FIG. 1, results in the reflection of the red and blue wavelengths and transmittance of the green wavelength of P polarized white light. By changing the angle of polarization (e.g. from P to S polarized light) of incident light 104, dichroic layers 102 and 103 will reflect the cyan and yellow wavelengths of incident light 104. Very little transmitted light 105 is produced by optical element 100 when either the cyan or yellow wavelength of light is reflected by optical element 100.

As can be readily appreciated, the wavelength separation properties of optical element 100 can be controlled by the angle at which incident light 104 is polarized. The angle at which incident light 104 is polarized can be controlled electrically using electrical optical effects and the like well known in the art. Accordingly, the color light produced by optical element 100 can be electrically controlled.

Figure 2:
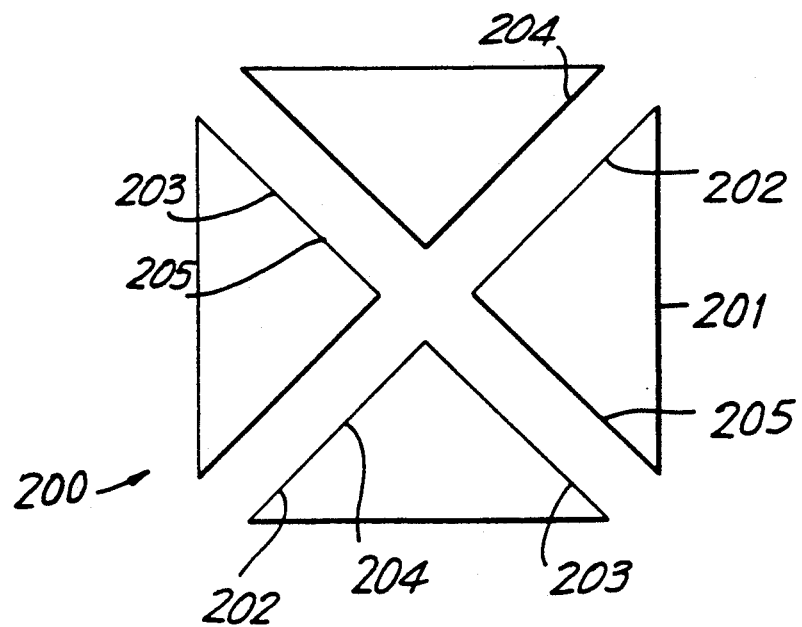
FIG. 2 is an exploded plan view of the dichroic element of FIG. 1.

FIG. 2 illustrates a dichroic optical element 200 in accordance with the invention. A dichroic layer is coated on the side of each of the right angled prisms 201 (i.e., the sides of each right angled prism 201 which are positioned next to a corresponding side of another right angle prism 201). Each prism 201 has two sides one or both of which are coated. The four right angled prisms 201 are then joined to one another to form two dichroic layers.

The sides of the four right angled prisms 201 can be coated to form a first dichroic layer 202 and a second dichroic layer 203. Alternatively, the sides of the four right angled prisms 201 can be coated to form a first dichroic layer 204 and a second dichroic layer 205. Dichroic layers 202 and 203 or 204 and 205 are prepared using any suitable, well known technique for producing an optical thin film.

In forming the dichroic layers, two kinds of complicated dichroic layers can be combined. More particularly, more than one kind of dichroic coating can be used to form a dichroic layer on surface 202 and 203 or 204 and 205. After each of right angle prisms 201 is coated with a dichroic layer, they are joined (adhered) to a corresponding side of another right angled prism 201. The wavelengths which are reflected and transmitted through element 200 are controlled by controlling the angle of polarization of the incident polarized light.

By providing incident polarized light to dichroic optical element 200, the incident light can be separated into desired wavelengths of polarized reflected and transmitted light.

EXAMPLE 2

Figure 4:
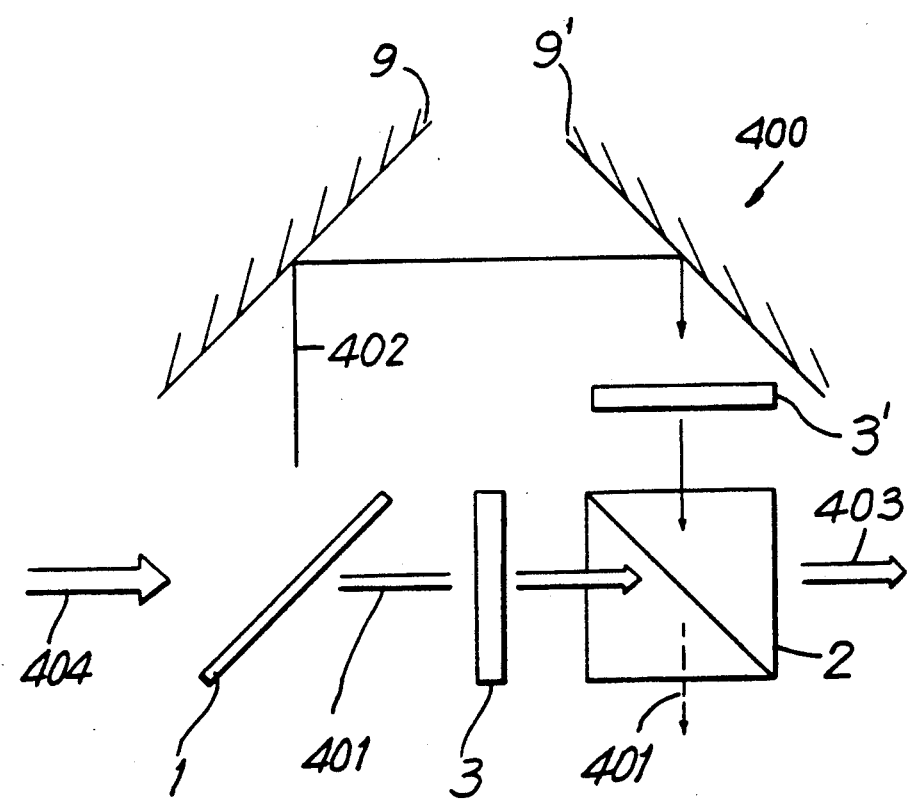
FIG. 4 is a diagrammatic plan view of a dichroic optical apparatus arranged in accordance with the invention.

As shown in FIG. 4, a dichroic optical apparatus 400 produces four different colors of light using two optical elements and has different wavelength transition regions. No overlap of the wavelength transition regions between the two optical elements occurs. Because of this, apparatus 400 operates at a much higher light flux efficiency as compared to a conventional projection type display apparatus.

Dichroic apparatus 400 includes a first optical element 1 which receives incident light 404 separating the same into a reflected light 402 and a transmitted light 401. Reflected light 402 is further reflected by reflectors 9 and 9'. Transmitted light 401 and reflected light 402 following reflection by reflector 9' are directed toward light valves 3 and 3' which modulate light 401 and 402 based on the image to be formed, respectively. Reflected light 402 and transmitted light 401 following modulation b light valves 3' and 3, respectively, are directed toward a second optical element 2 which transmits and reflects the modulated light based on the polarization and wavelengths of the light. A projected light 403 is produced by second optical element 2.

Figure 5A:
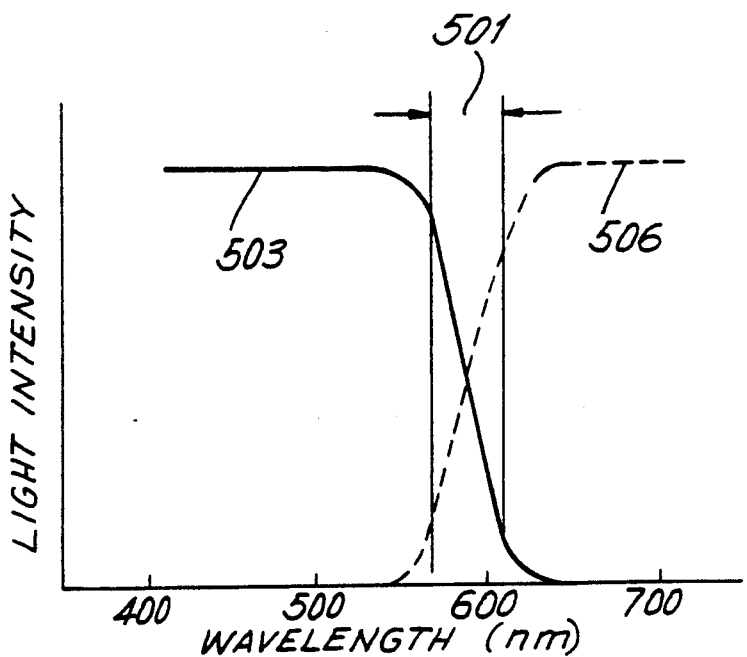
FIGS. 5(a) and 5(b) are plots of light intensity versus wavelength for the first and second optical elements of FIG. 4.

FIG. 5(a) illustrates the wavelength selection properties of first optical element 1. Transmitted light 401 is represented by a curve 503. Reflected light 402 is represented by a curve 506. The skirts of curves 503 and 506 are within a wavelength transition region 501.

Figure 5B:
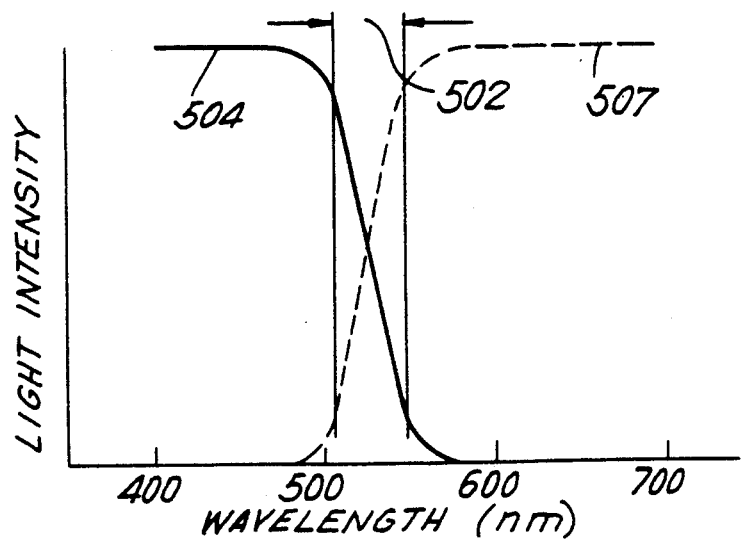
Figure 5C:
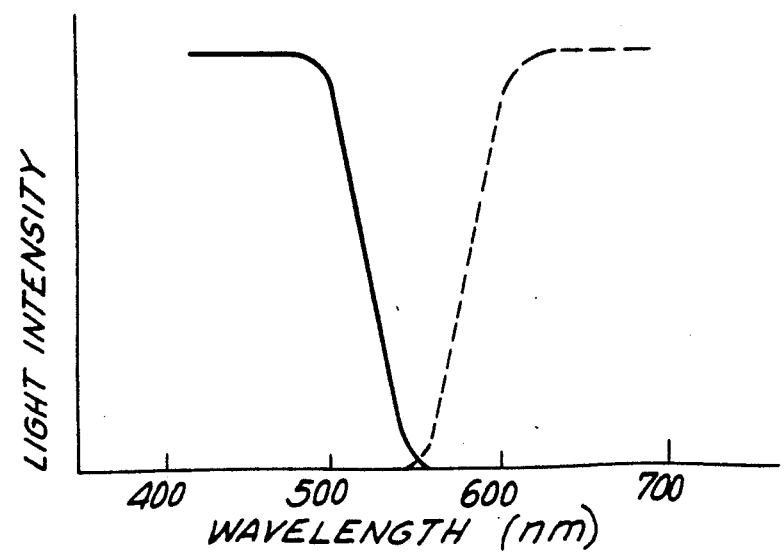
FIG. 5(c) is a plot of light intensity versus wavelength following synthesis of the light in the dichroic optical apparatus of FIG. 4.
Figure 10A:
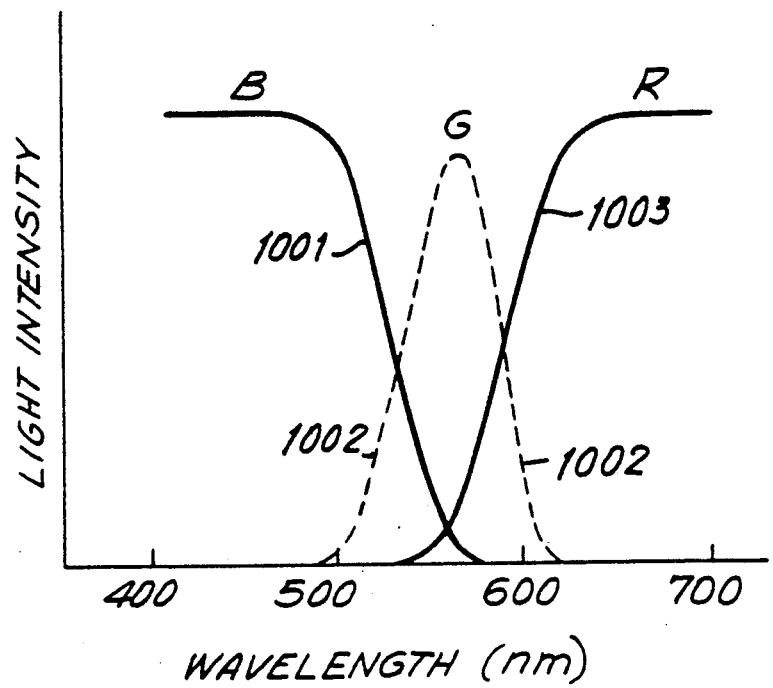
FIG. 10(a) is a plot of light intensity versus wavelength of a prior art optical element.
Figure 10B:
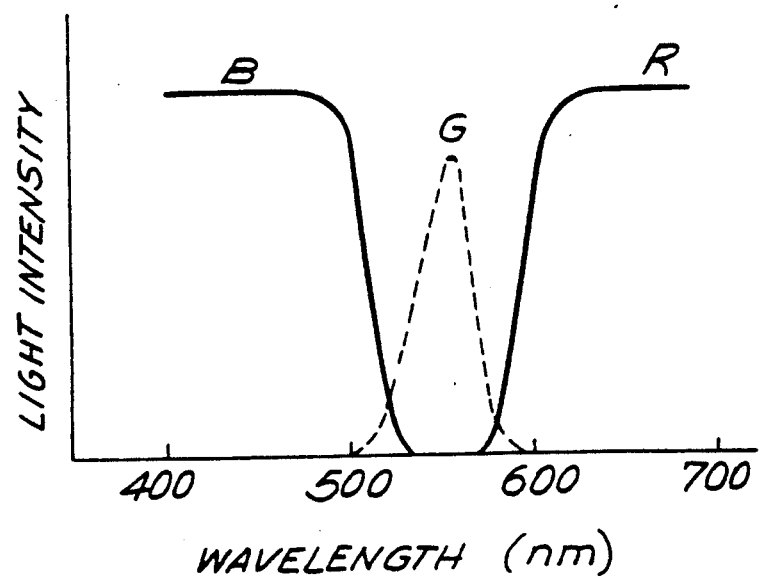
FIG. 10(b) is a plot of light intensity versus wavelength following synthesis in the prior art optical element of FIG. 10(a).

FIG. 5(b) illustrates the wavelength selection properties of second optical element 2. Transmitted light is represented by a curve 504 and reflected light is represented by a curve 507. The skirts of curves 504 and 507 are within a wavelength transition region 502. Wavelength transition regions 501 and 502 do not overlap one another. As a result, projected light 403 (i.e., following synthesis by second optical element 2) has an intensity spectrum illustrated by FIG. 5(c). In particular, since wavelength transition regions 501 and 502 do not overlap one another, there is no significant reduction in light intensity as compared to a conventional dichroic optical apparatus having the light intensity characteristics of FIG. 10(b).

Referring once again to FIG. 4, when light valves 3 and 3' are positioned between first optical element 1 and second optical element 2 the multicolored synthesized image represented by projected light 403 can have a magenta color based on the synthesization of the blue and red wavelengths of light. Projected light 403 is determined based on the wavelength selection properties of optical elements 1 and 2.

EXAMPLE 3

In producing a multicolor display, a projection type display device in accordance with an alternative embodiment of the invention has the first optical element coated for selectively reflecting the red and blue wavelengths. The second optical element is coated for selectively reflecting the yellow and cyan wavelengths. The wavelength selection properties of the first optical element are substantially the opposite (i.e., reverse) of the wavelength selection properties of the second optical element. Providing a cross-shaped surface for depositing coatings of the dichroic optical layers advantageously shortens the optical length.

Light valves are used to both modulate and polarize light so as to produce a desired image. Accordingly, polarized light (e.g., S polarized or P polarized light) of a particular wavelength representing a desired image can be directed toward the second optical element. The polarized light which is selectively reflected by an optical element can be different from the polarized light which is transmitted. In particular, the colored light which is selectively reflected by the second optical element is light which has a transition region which does not overlap the transition region of the first optical element. That is, the wavelength selection properties of the first and second optical elements are not the same. The colored light which is transmitted by the first and second optical elements is not affected by the wavelength selection properties of the first and second optical elements.

Figure 6:
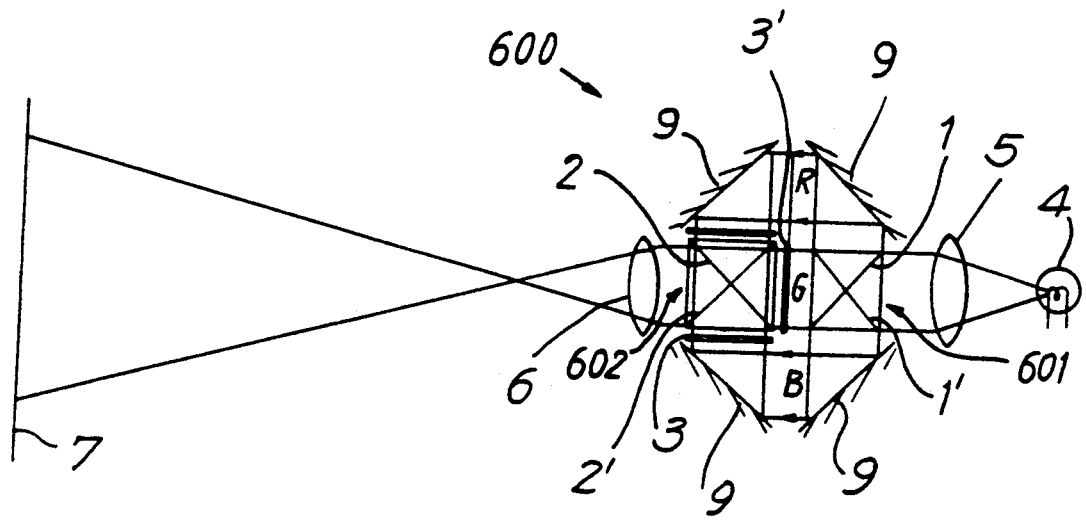
FIG. 6 is a diagrammatic plan view of a color projection type display apparatus in accordance with another embodiment of the invention.

As shown in FIG. 6, a projection type display apparatus 600 as described above includes a first optical element 601 having a blue (B) reflective dichroic mirror 1 and a red (R) dichroic mirror 1'. Dichroic mirror 1 and dichroic mirror 1' are positioned relative to one another to form the shape of a cross. A second optical element 602 includes an S polarized cyan (C) reflective dichroic mirror 2 and an S polarized yellow (Y) reflective mirror 2'. Dichroic mirror 2 and dichroic mirror 2' are also positioned relative to one another in the shape of a cross.

A white light source 4 produces white light which is directed through a collimating lens 5 toward first optical element 601. Light transmitted by second optical element 602 is directed towards a projection lens 6 which projects the synthesized image transmitted by second optical element 602 towards a screen 7. A mirror 9 reflects the blue (B) and red (R) wavelengths of light toward second optical element 602. Light valves 3 and 3' modulate the colored light produced by first optical element 601 in accordance with the image to be formed and include active matrix twisted nematic (TN) liquid crystal panels. First optical element 601 is assembled to have the color separation properties illustrated in FIG. 7(a) and divides the white light of light source 4 into blue (B), green (G) and red (R) wavelengths.

The red (R) wavelength and blue (B) wavelength of light separated by first optical element 601 are reflectingly separated from the white incident light and have at least an S polarized component. The red and blue light produced by the first optical element are redirected by mirrors 9 and 9' towards light valve 3'. The green component of light produced by light source 4, which includes at least a P polarized component, is transmitted directly through first optical element 601, without reflection, toward light valve 3. The polarizers (not shown) of light valves 3 and 3' are disposed thereon using Nicol's deposition. When light valves 3 and 3' are in the transmission mode, the red and blue wavelengths of the S polarized light and the green wavelength of P polarized light representing the desired image are directed toward second optical element 602.

Figure 7A:
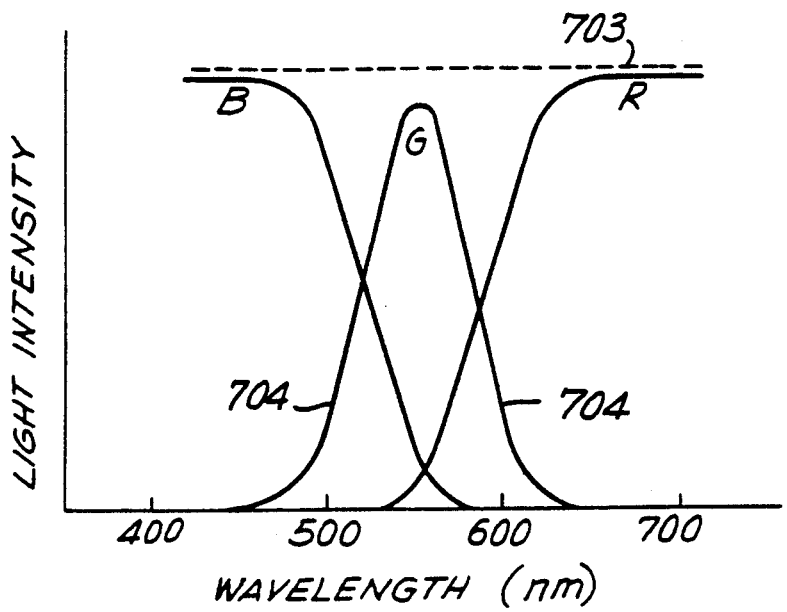
FIG. 7(a) is a plot of light intensity versus wavelength for the first optical element of FIG. 6.
Figure 7B:
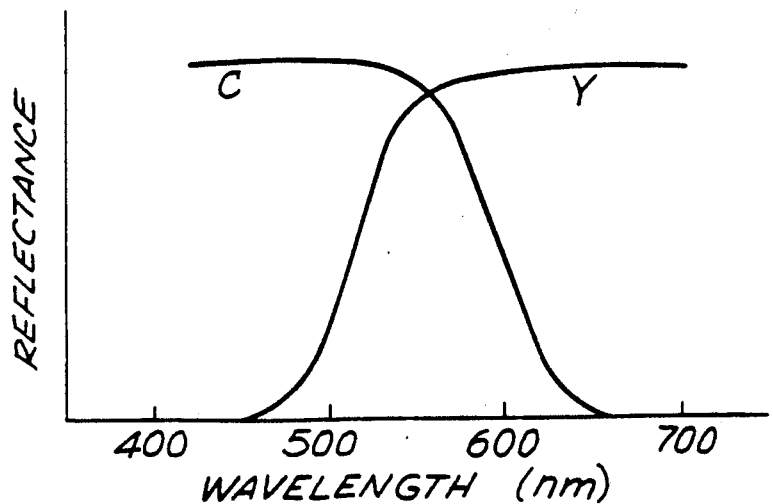
FIG. 7(b) is a plot of reflectance versus wavelength for the second optical elements of FIG. 6.
Figure 7C:
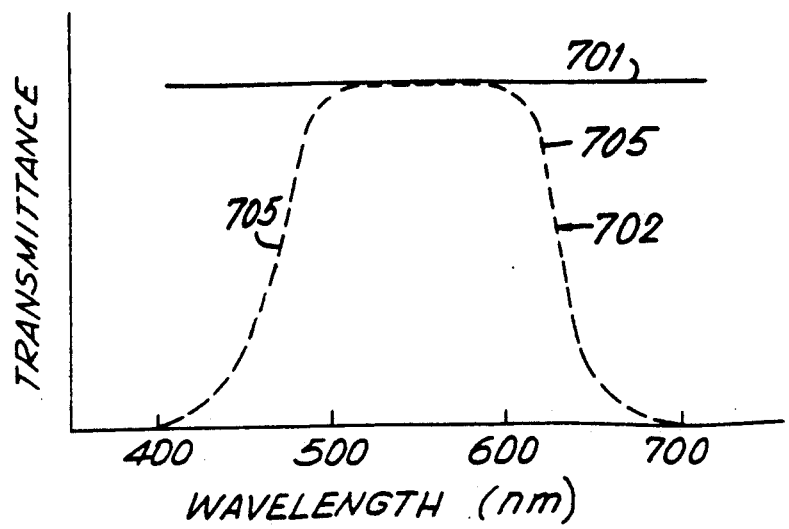
FIG. 7(c) is a plot of transmittance versus wavelength for the second optical element of FIG. 6.

The reflective properties of S polarized cyan (C) dichroic mirror 2 and S polarized yellow (Y) mirror 2' are illustrated in FIG. 7(b). The transmittance properties of second optical element 602 with respect to P polarized light are illustrated by the solid line in FIG. 7(c). Second optical element 602 reflects the yellow and cyan wavelength of the S polarized light and transmits the P polarized light therethrough. In particular, second optical element 602 synthesizes the red and blue components of light of FIG. 7(a) in accordance with the reflectance characteristics of FIG. 7(b) and the green component of light in accordance with the transmittance characteristics of FIG. 7(c). It is of particular importance that the blue (B) and cyan (C) wavelength transition regions should not overlap one another. Similarly, the red (R) and yellow (Y) wavelength transition regions should not overlap one another. When this occurs there is no appreciable loss of lumens in the transmitted image since apparatus 600 avoids using optical elements for separating and synthesizing which have substantially the same wavelength transition properties.

Dichroic optical elements which include a dielectric multilayer are well known and commonly available can be used for first optical element 601 and second optical element 602. It is to be understood, however, that the optical properties illustrated in FIGS. 7(a), 7(b) and 7(c) need not be used and may be difficult to realize since vibration due to interference may be generated. It is only necessary that the wavelength transition regions of first optical element 601 and second optical element 602 do not overlap one another in order to achieve the advantages of the invention.

Referring once again to FIG. 7(c), second optical element 602 exhibits a level (even) transmittance characteristic (i.e., a relatively straight line) denoted by solid line 701. Alternatively, second optical element 602 can have the wavelength selection properties represented by dotted line 702 with respect to the green wavelength of light. The wavelength selection properties represented by solid line 701 has no wavelength transition region. Therefore, there is no overlap of the wavelength transition region represented by skirts 704 of the G wavelength with solid line 701. The wavelength selection properties represented by line 702 include wavelength transition regions represented by a pair of skirts 705. The wavelength transition regions of the green (G) component of light do not overlap wavelength transition region 705 of second optical element 602.

The color separation properties of optical element 601 also can include a specified polarized light being transmitted at a substantially constant level of intensity as represented by a line 703 in FIG. 7(a). Therefore, rather than requiring that optical element 601 separate the white incident light into its green (G) component, light can be transmitted through first optical element 601 with a filter having the green wavelength characteristic positioned between first optical element 601 and second optical element 602. Such a filter should have wavelength transition regions which do not effectively overlap the wavelength selection transition region of second optical element 602.

By substantially eliminating the overlap between the wavelength transition regions of first optical element 601 and second optical element 602, the light flux loss rate of apparatus 600 is between about 10% and 30% compared to a conventional projection type display apparatus having light flux loss rates of about 50%. In other words, in accordance with the invention, the light flux of the synthesized image can be increased by as much as a factor of two compared to a synthesized image produced by a conventional projection type display apparatus.

EXAMPLE 4

Figure 8:
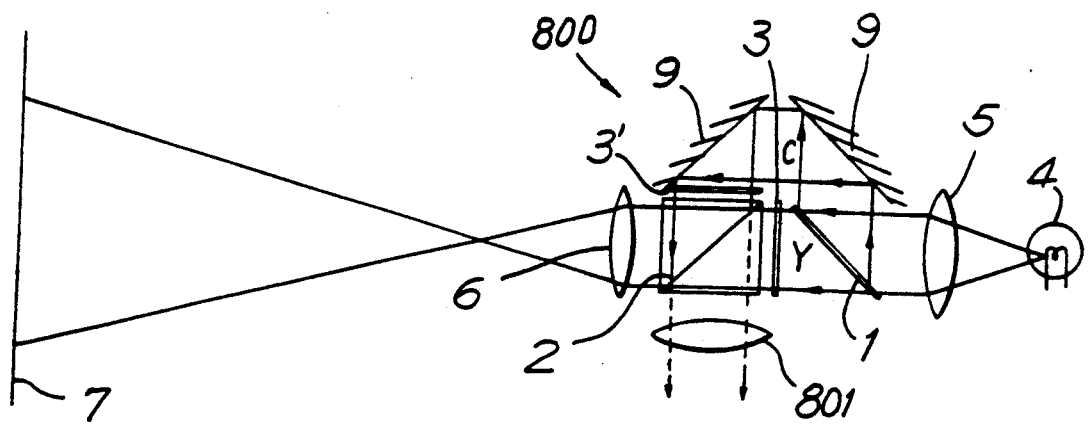
FIG. 8 is a diagrammatic plan view of a projection type display apparatus in accordance with a further embodiment of the invention.

FIG. 8 illustrates a projection type multicolor display apparatus 800 arranged in accordance with another embodiment of the invention. The wavelength region of second optical element 2 for separating and dividing the multicolor light is relatively large. The wavelength region of second optical element 2 for synthesizing the multicolor light is, however, relatively narrow.

The light from light source 4 is collimated by collimating lens 5 and then separated by first optical element 1. The reflected component of light entering first optical element 1 is redirected by mirror 9 toward light valve 3'. The transmitted component of the light entering first optical element 1 is directly transmitted, without reflection, toward a light valve 3. The transmitted and reflected components are then synthesized by second optical element 2. The synthesized component of light produced by second optical element 2 passes through projection lens 6 and is directed towards screen 7 for producing an image thereon.

Figure 9A:
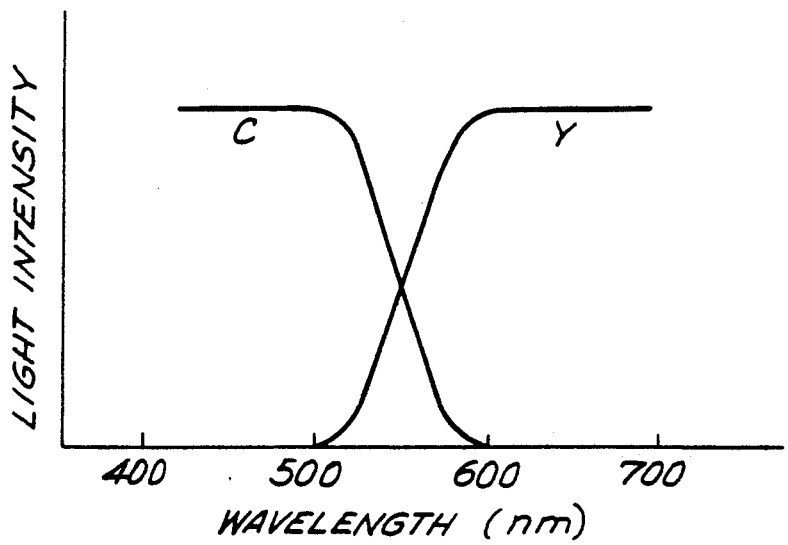
FIGS. 9(a) and 9(b) are plots of light intensity versus wavelength for the first and second optical elements of FIG. 8, respectively.
Figure 9B:
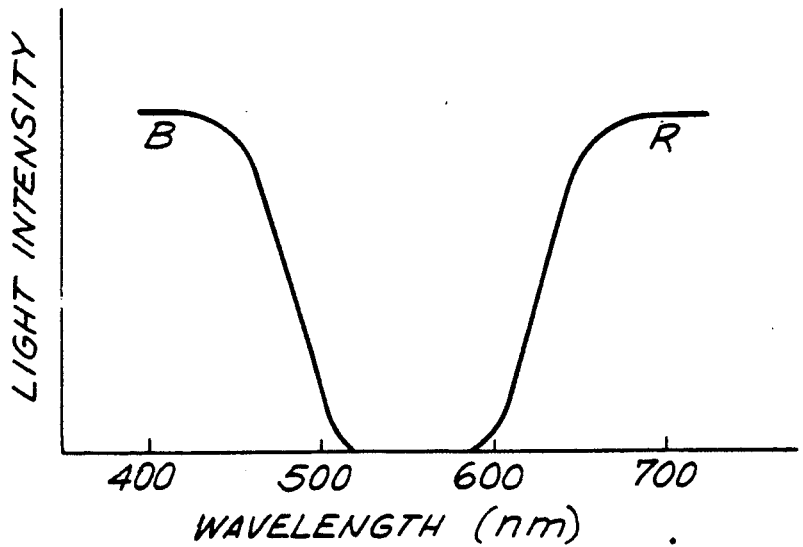
Figure 9C:
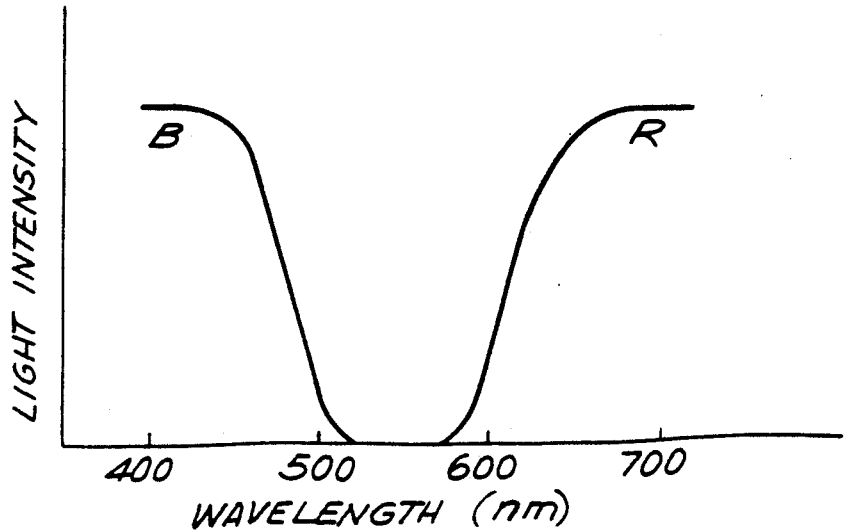
FIG. 9(c) is a plot of light intensity versus wavelength following synthesis in the projection type display apparatus of FIG. 8.

The wavelength separation properties of first optical element 1 are shown in FIG. 9(a). The wavelength synthesizing properties of second optical element 2 are shown in FIG. 9(b). First optical element 1 reflects the cyan (C) component of light and transmits the yellow (Y) component of light around a visible region of about 550 nm. Second optical element 2 reflects the blue (B) component light and transmits the red (R) component light. The Y component of light and C component of light in the region of about 500-550 nm are not synthesized by second optical element 2 but rather are emitted by second optical element 2 as a leakage light 801. The intensity of the synthesized component of light produced by second optical element 2 is shown in FIG. 9(c).

The wavelength selection region of first optical element 1 is relatively large whereas the wavelength selection region of second optical element 2 is relatively narrow. An excellent common multicolor display having a high level of color purity with respect to the red, blue and magenta wavelengths results and is achieved by preventing any overlap in the wavelength transition regions associated with first optical element 1 and second optical element 2.

A polarized beam splitter can be used as first optical element 1 to provide the relatively large wavelength regions of FIG. 9(a). First optical element 1 reflects the S polarized (i.e., C component) and transmits the P polarized light (i.e., Y component). The S polarized cyan component of light and the P polarized yellow component of light during the transmission mode of light valves 3 and 3' produces images which are synthesized by second optical element 2. Very little if any light is lost by preventing the overlap of corresponding wavelength transition regions of first optical element 1 and second optical element 2. An extremely effective color projection display results. Alternatively, the wavelength selection properties of FIG. 9a can represent second optical element 1 and the wavelength selection properties of FIG. 9(b) can represent first optical element 1. In either embodiment, optical element 1 separates the light based on the polarizing angles of the incident light and optical element 2 synthesizes the wavelengths of light separated by optical element 1 based on wavelength. A dichroic mirror is used in second optical element 2.

As now can be readily appreciated, the optical elements for separating and synthesizing color light have wavelength selection-transition regions which do not effectively overlap one another. In accordance with the invention, by determining the polarization properties of the optical elements a projection type display apparatus having relatively low flux losses and operating at a high lumen efficiency is obtained.

The wavelength selection properties are controlled by the incident polarized light and are applicable to various types of optical apparatus. In accordance with the invention, a compact type optical system can be constructed by shaping a prism into a cube.

Since only one optical element can determine the color reproducing properties of the projection type display apparatus, the other optical element need not have sharp, well defined selection properties. The focal length between the projection lens and the light valves can be reduced to a minimum by positioning the dichroic layers of an optical element relative to each other in the form of a cross. A simplified lens design results.

It will thus be seen that the objects set forth above, and those made apparent from the preceding description, are efficiently obtained and, since certain changes may be made in the above method and construction set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention, which, as a matter of language, might be said to fall therebetween.

What is claimed is:

1. An optical element, comprising:
   a transparent body having more than one surface; and
   at least two dichroic means, each dichroic means disposed on at least one surface of the body for transmitting and reflecting different wavelengths of polarized light, each dichroic means having dichroic characteristics which vary in response to the polarization of the light received by said dichroic means;
   wherein the at least two dichroic means includes two different kinds of dichroic layers.

2. An optical element, comprising:
   a transparent body having more than one surface; and
   dichroic means disposed on at least one surface of the body for transmitting and reflecting different wavelengths of polarized light, said dichroic means characterized by wavelength selection properties which vary in response to the polarization of the light received by said dichroic means;
   wherein the dichroic means includes means for reflecting a first wavelength having a first transition region in response to a first polarized light and for reflecting a second wavelength having a second transition region in response to a second polarized light, said first and second transition regions having substantially no common wavelength therebetween; and
   wherein the dichroic means includes two different kinds of dichroic layers.

3. The optical element of claim 2, wherein the two dichroic layers are positioned so as to cross each other.

4. The optical element of claim 2, wherein the body includes four right angled prisms, at least one surface of at least two prisms having one of said dichroic means thereon.

5. The optical element of claim 3, wherein the body includes four right angled prisms, at least one surface of at least two prisms having one of said dichroic means thereon.

6. The optical element of claim 5, wherein each prism has two right angled sides, said at least one surface of each of said at least two prisms is on one of the right angled sides.

7. An optical element, comprising:
   a transparent body having more than one surface; and
   dichroic means disposed on at least one surface of the body for transmitting and reflecting different wavelengths of polarized light, said dichroic means characterized by wavelength selection properties which vary in response to the polarization of the light received by said dichroic means;
   wherein the dichroic means includes means for reflecting a first wavelength having a first transition region in response to a first polarized light and for reflecting a second wavelength having a second transition region in response to a second polarized light, said first and second transition regions having substantially no common wavelength therebetween;

wherein the first wavelength and second wavelength are within a range of between about 400 to 700 nm; and wherein the dichroic means includes two different kinds of dichroic layers.

8. The optical element of claim 7, wherein the body includes four right angled prisms, at least one surface of at least two prisms having one of said dichroic means thereon.

9. The optical element of claim 8, wherein each prism has two right angled sides, said at least one surface of each of said at least two prisms is on one of the right angled sides.

10. The optical element of claim 7, wherein the two dichroic layers are positioned so as to cross each other.

11. The optical element of claim 10, wherein the body includes four right angled prisms, at least one surface of at least two prisms having one of said dichroic means thereon.

12. The optical element of claim 11, wherein each prism has two right angled sides, said at least one surface of each of said at least two prisms is on one of the right angled sides.

13. A projection type display apparatus, comprising
a source of light having a spectrum including light of at least two colors;
first optical means for separating the incident light into said colors of light and characterized by at least one first wavelength transition region;
light valve means for receiving and modulating the colors of light;
second optical means for synthesizing the modulated colors of light and producing a synthesized image, said second optical means characterized by at least one second wavelength transition region; and
projection means for projecting the synthesized image;
wherein said at least one first wavelength transition region does not effectively overlap said at least one second wavelength transition region.

14. The projection type display apparatus of claim 13, wherein the first optical means and second optical means each have a dichroic layer.

15. The projection type display apparatus of claim 13, wherein the first optical means and second optical means each have two dichroic layers.

16. The projection type display apparatus of claim 15, wherein the two dichroic layers of the first optical means have different wavelength selection properties and the two dichroic layers of the second optical means have different wavelength selection properties.

17. The projection type display apparatus of claim 16 wherein the two dichroic layers of the first optical means are positioned at substantially right angles to each other and the two dichroic layers of the second optical means are positioned substantially at right angles to each other.

18. The projection type display apparatus of claim 16, wherein each dichroic layer of the first optical means and the second optical means has a wavelength transition region, each of the dichroic layers of the first optical means producing a different one of the colors of light, and each of the dichroic layers of said second optical means being positioned relative to a corresponding dichroic layer of said first optical means to receive the light transmitted by the corresponding dichroic layer of said first optical means as modulated by said light valve means.

19. The projection type display device of claim 18, wherein the wavelength transition regions of the corresponding dichroic layers of the first optical means and second optical means do not effectively overlap one another.

20. The projection type display apparatus of claim 13, wherein said colors include red and blue.

21. The projection type display apparatus of claim 16, wherein one of two dichroic layers of the first optical means and one of the two dichroic layers of the second optical means are operable for reflecting the red component of light and the other of the two dichroic layers of the first optical means and the other of the two dichroic layers of the second optical means are operable for reflecting the blue component of light.

22. The projection type display apparatus of claim 17, wherein one of two dichroic layers of the first optical means and one of the two dichroic layers of the second optical means are operable for reflecting yellow component of light and the other of the two dichroic layers of the first optical means and the other of the two dichroic layers of the second optical means are operable for reflecting cyan components of light.

23. The projection type display apparatus of claim 13, wherein the second optical means includes dichroic means for transmitting and reflecting different wavelengths of polarized light, said dichroic means characterized by wavelength selection properties which vary in response to the polarization of the light received by said dichroic means.

24. The projection type display apparatus of claim 16, wherein the wavelength selection properties of the two dichroic layers of the second optical means varies in response to the polarization of the modulated color light received by each of these two dichroic layers.

25. The projection type display apparatus of claim 17, wherein the wavelength selection properties of the two dichroic layers of the second optical means varies in response to the polarization of the modulated color light received by each of these two dichroic layers.

26. The projection type display apparatus of claim 18, wherein the wavelength selection properties of the two dichroic layers of the second optical means varies in response to the polarization of the modulated color light received by each of these two dichroic layers.

27. The projection type display apparatus of claim 19, wherein the wavelength selection properties of each of the two layers of the second optical means varies in response to the polarization of the modulated color light received by each of these two dichroic layers.

28. The projection type display apparatus of claim 20, wherein the wavelength selection properties of the two dichroic layers of the second optical means varies in response to the polarization of the modulated color light received by each of these two dichroic layers.

29. The projection type display apparatus of claim 13, wherein the light valve means is operable for polarizing the modulated colors of light.

30. The projection display apparatus of claim 29, wherein the light valve means is operable for producing the modulated colors of light at two different angles of polarization.

31. The projection type display apparatus of claim 30, wherein the first optical means includes dichroic means for separating the incident light into different colors by reflecting and transmitting light of different wavelengths of the incident light, said light transmitted by said first optical means being polarized by said light valve means at different polarizing angles than said light reflected by said first optical means.

32. The projection type display apparatus of claim 16, wherein the light valve means is operable for polarizing the modulated colors of light.

33. The projection type display apparatus of claim 32, wherein the light means is operable for producing different modulated colors of light at two different angles of polarization.

34. The projection type display apparatus of claim 17, wherein each dichroic layer of the first optical means and the second optical means has a wavelength transition region, each of the dichroic layers of the first optical means producing a different one of the colors of light, and each of the dichroic layers of said second optical means being positioned relative to a corresponding dichroic layer of said first optical means to receive the color light produced by the corresponding dichroic layer of said first optical means as modulated by said light valve means.

35. The projection type display device of claim 19, wherein the wavelength transition regions of the corresponding dichroic layers of the first optical means and second optical means do not effectively overlap one another.

36. A method of projecting an image on a screen, comprising:
separating incident light into different colors of light, each color of light being characterized by a first wavelength transition region;
modulating the different colors of light;
synthesizing the different modulated colors of light to produce a synthesized image by reflecting and transmitting the modulated colors by at least one dichroic mirror, wherein reflecting and transmitting characteristics of the dichroic mirror include second wavelength transition regions; and
projecting the synthesized image toward a screen;
wherein the first wavelength transition region of each modulated color of light reflected by a corresponding dichroic mirror and the second wavelength transition region of the corresponding dichroic mirror do not effectively overlap one another.

37. The method of claim 26, wherein the step of separating the incident light includes reflecting and transmitting the incident light using at least one dichroic layer.

38. The method of claim 37, wherein the step of separating the incident light includes reflecting and transmitting the incident light using two dichroic layers.

39. The method of claim 38, wherein the two dichroic layers have different wavelength selection properties.

40. The method of claim 39, wherein the two dichroic layers are positioned at substantially right angles to each other.

41. The method of claim 36, wherein the step of synthesizing includes producing a synthesized image with two dichroic mirrors having different wavelength selection properties.

42. The method of claim 40, wherein the step of synthesizing includes producing a synthesized image with two dichroic mirrors having different wavelength selection properties.

43. The method of claim 42, further including positioning the dichroic mirrors for synthesizing relative to the corresponding dichroic layers for separating so that the dichroic mirrors for synthesizing receive the color lights produced by the corresponding dichroic layers for separating following modulation.

44. The method of claim 43, wherein the wavelength selection region of each dichroic layer and each dichroic mirror varies based on the polarization of light received by the same.

* * * * *